United States Patent [19]
Goldsmith

[11] Patent Number: 6,105,615
[45] Date of Patent: Aug. 22, 2000

[54] CONTROL VALVE

[75] Inventor: Peter J. Goldsmith, Houston, Tex.

[73] Assignee: Control Rain Systems, Inc., Houston, Tex.

[21] Appl. No.: 09/217,294

[22] Filed: Dec. 21, 1998

[51] Int. Cl.[7] .................................. F16K 11/044
[52] U.S. Cl. ........................ 137/625.5; 137/327
[58] Field of Search ................. 137/625.5, 327

[56] References Cited

U.S. PATENT DOCUMENTS

| | | | |
|---|---|---|---|
| 3,063,469 | 11/1962 | Freeman | 137/625.5 |
| 3,461,911 | 8/1969 | Janczur | 137/625.5 |
| 3,902,526 | 9/1975 | Brake et al. | 137/625.64 |
| 4,193,423 | 3/1980 | Stoll et al. | 137/725.64 |
| 4,694,848 | 9/1987 | Jorgensen et al. | 137/114 |
| 5,345,857 | 9/1994 | Murphy | 92/34 |

*Primary Examiner*—John Fox
*Attorney, Agent, or Firm*—Robert W B Dickerson

[57] ABSTRACT

A valve device for selectively controlling the flow of high-pressure fluid from a source to either of a dump, or discharge, mechanism or to a gun used for water blasting; said valve device includes opposed valve seats and a valve member movable between said seats thereby controlling such flow.

2 Claims, 2 Drawing Sheets

CONTROL VALVE

BACKGROUND OF THE INVENTION

Water blasting equipment has long been used for numerous industrial purposes, such as coating removal. For purposes of economy, it is desirable to operate a plurality of such items of equipment, specifically guns, from a single source of pressurized fluid. Since such operations are oftentimes in the field, and since heavy usage results in occasional break down of equipment, particularly of the valve-related components, it is desirable that field maintenance and repair be permitted. It is toward accomplishment of these goals, particularly the latter, that this invention is directed.

SUMMARY OF THE INVENTION

One or more satellite, control-valve housings may be linked to a central source of fluid under pressure, normally water, pressurized in the range of 40,000 p.s.i. Additionally, a pneumatically controlled actuator for each such satellite would communicate with a central source of pressurized air. Each satellite housing would include an inlet for such fluid and at least two outlets therefor, one being for conveyance to a gun, or similar equipment, and one for discharge or energy dissipation. Valve control means is provided each such satellite for controlling fluid flow between said pressurized fluid inlet and either of said fluid outlets. Said valve means includes a valve member having spaced, oppositely directed seat engaging surfaces, and spaced valve seats for sealingly engaging each of said valve member's seat engaging surfaces.

DESCRIPTION OF THE INVENTION

Figure 1:
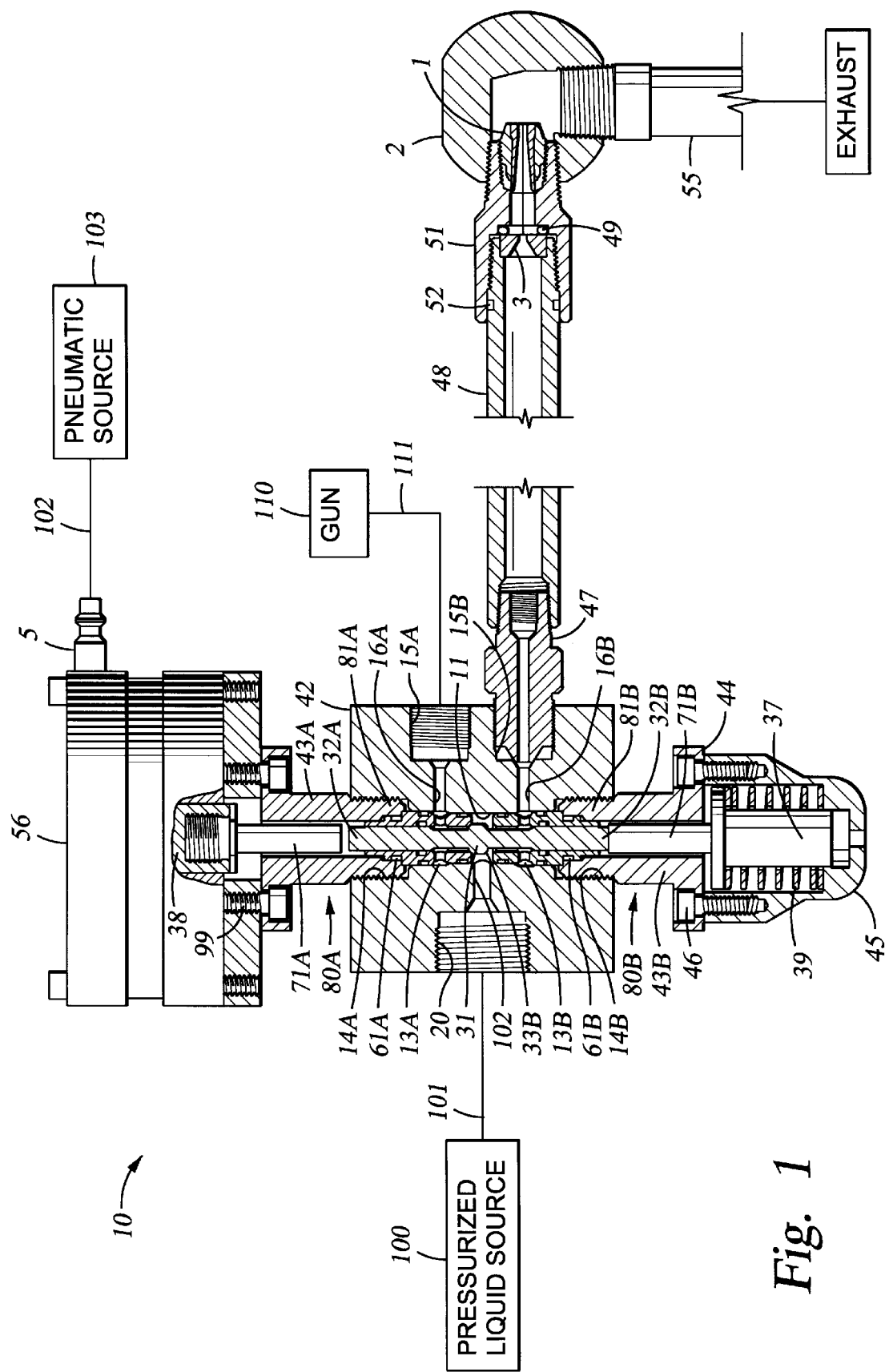
FIG. 1 is a partly schematic, side elevation, partly in axial section and partially exploded, of the device of this invention.
Figure 3:
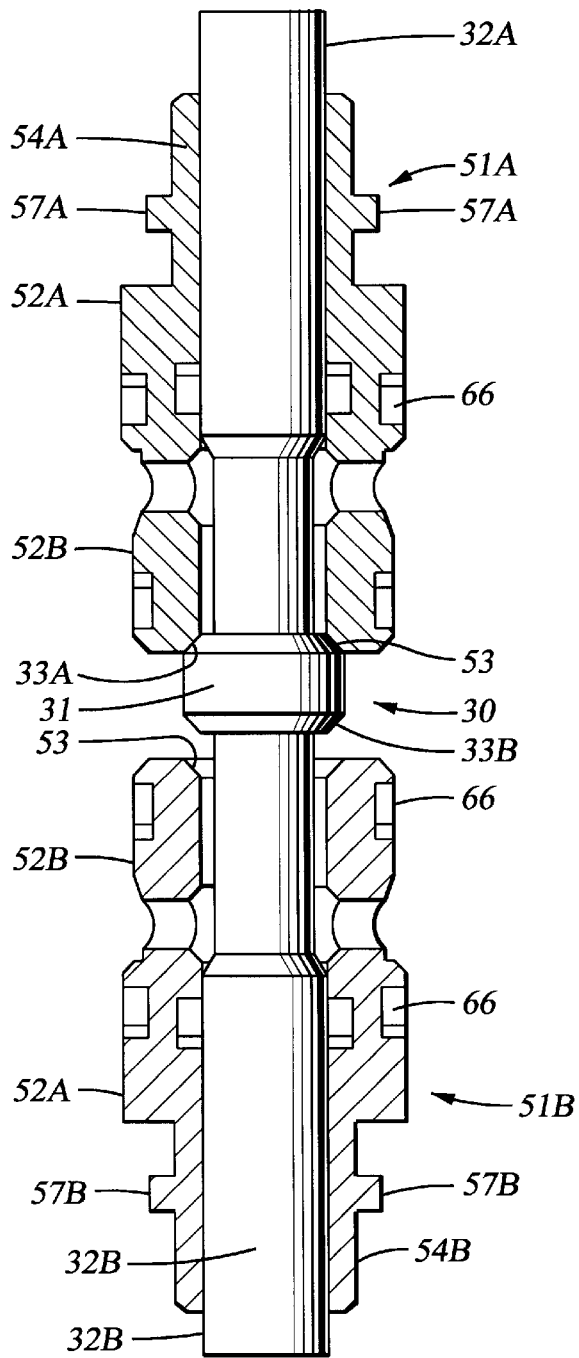
FIG. 3 is an enlarged axial section of the valve and valve seats.

Looking at the drawing, particularly FIGS. 1 and 3, a central block 42 of the flow control valve 10 of this invention includes an axial bore 11 centrally thereof, said bore communicating with oppositely spaced counterbores 13A and 13B, said counterbores 13A and 13B additionally communicating with threaded counterbores 14A and 14B, respectively. Threaded bore 20 comprises an inlet for pressurized liquid (normally water) received through a fitting not shown, from source 100 via line 101. Passageway 102 commiiunicatingly links inlet 20 with central block bore 11. A pair of spaced fluid outlets 15A and 15B are in communication respectively with counterbores 13A and 13B through passageways 16A and 16B, respectively.

Figure 2:
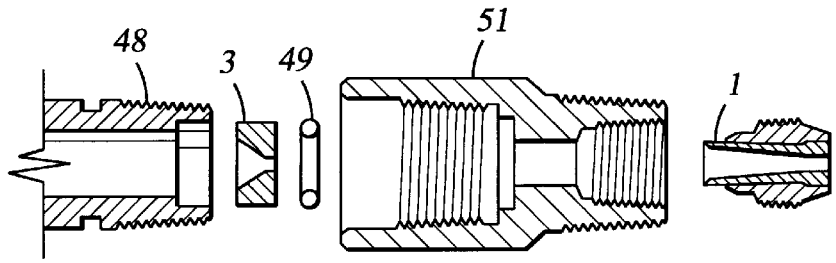
FIG. 2 is an exploded axial section of the energy dissipater assembly of FIG. 1.

Outlet 15A permits the passage of fluid under pressure, through a fitting not shown, and through conduit 111, to a water blasting device (gun) 110. Outlet 15B links inlet 20 with one end of discharge or dump tube 48 through threaded fitting 47. The other end of tube 48, through its linkage with adapter 51, elbow 2, and the energy dissipation components of FIG. 2, if desired, may discharge through hose 55.

The mentioned energy dissipation components are not necessary to practice this invention. They do assist in supporting multi-gun operation supplied by a single liquid source. These components include dump tube 48, seal 52, focusing cone 3, seal 49, adapter 51 and orifice insert 1. Numerous modified energy dissipation combinations are possible.

Consider now the fundamental nature of this invention, and the structure contributing thereto, particularly as shown in FIG. 3. The control valve assembly comprises valve 30 having central valve body 31 and opposite depending valve stems 32A and 32B. Valve body 31 has opposite faces 33A and 33B forming oppositely directed seat-engaging surfaces. Oppositely directed valve seat segments are numbered 51A and 51B. Each seat segment includes a pair of sealing cylinders 52A and 52B. Adjacent to, and facing each other, each said seat cylinder 52B provides a chamfered valve seat 53 for sealing engagement with either of valve faces 33A and 33B. Each valve seat cylinder 52A and 52B carries an annular seal 66. Each said valve seat segment includes a depending skirt, 54A or 54B, said skirts each having opposed lugs 57A or 57B depending from their respective skirts.

Said threaded, axial block counterbores 14A and 14B receive exteriorly threaded lips 81A and 81B of valve seat adapters 43A and 43B. Each adapter includes on the interior of its lip an axial slot or bore 61A or 61B, of substantially T-shaped configuration to receive lugs 57A and/or 57B such that such lugs may rotate relative to said adapters 43A or 43B. This permits the adjacent valve seat segment 51A or 51B to be withdrawn from block 42 along with the adapter. This type of interlocking fastener was partially described in U.S. Pat. No. 5,349,982 assigned to the same assignee as is this application. However, this invention is the first instance, known to Applicant, to utilize an interchangeable, bifurcated valve seat in conjunction with the removability feature described herein.

Adapter 43B links block 42 of valve 10 to spring cap 45 by means of threaded counterbore 14B and bolts 46 securing the adapter's flange 44 to the cap. Interior of hollow member 45, spring piston 37 is biased by spring 39 toward engagement of its stem 71B with valve stem 32B. Opposite spring cap 45, air actuator 56 (only shown generally) is linked to adapter 43A by fasteners 99, and said adapter linked to housing 42 by threads 14A. Pressurized air provides air under a pressure in the range of 100 p.s.i. from source 103 to the actuator, by way of fitting 5 and line 102, i.e., to one side of a valve, preferably a diaphragm. Said diaphragm valve transfers this force, through a piston, against the actuator piston 38, urging its stem 71A against valve stem 32A.

In operation, in the absence of actuator 56 being actuated, high pressure liquid would be supplied by source 100 to inlet 20. Spring 39 would urge piston 37 and thereby valve 30 in a direction such that valve face 33A sealingly engages annular seat 53 of valve seat segment 51A. This blocks the flow of liquids from inlet 20 to liquid outlet 15A, while allowing such passage from inlet 20 to liquid outlet 15B. Once at said outlet 15B the pressurized fluid may be utilized in any number of fashions. These include dumping through orifice 1 after impacting focusing cone 3, or substituting a plug (not shown) for orifice insert 1. In the latter instance, there must be pressure compensation elsewhere in the system. Further, for use with a single gun, the orifice and focusing cone may be eliminated, effectively reducing the pressure to zero when the valve is shifted to the dump mode, as illustrated in FIG. 1.

On receipt of a signal from pneumatic source 103, as by squeezing the trigger on a water blast gun, pneumatic material (air) may pass through fitting 5, causing the diaphragm, carried by actuator 56, to urge actuator piston 38 to urge valve 30 against the bias of the spring so that valve body face 33A is removed from sealing engagement and instead valve body face 33B sealingly engages valve seat 53 of valve seat segment 51B. On this occurring, pressurized liquid passes from passageway 102, around the annulus between bore 11 and valve 30, through passageway 16A, out outlet 15A, through conduit 111 to blasting gun 110, where it is put to work, such as removing excess material, like old paint or other coatings.

Particularly advantageous is the structure permitting quick field maintenance. Adapter 43B, along with spring cap 45, can be unscrewed from threaded bore 14B. Likewise, adapter 43A, along with actuator 56 can be unscrewed from threaded bore 14A. As said adapters are removed, the two valve seat segments 51A and 51B are automatically withdrawn because of the previously described lug (57A,57B) and slot "T" (61A,61B) arrangement. The valve member 30 may be grasped, or will be withdrawn along with one of the valve seat segments.

Although only a single embodiment has been described, it should be obvious that numerous modifications would be possible by one skilled in the art without departing from the spirit of the invention, the scope of which is limited only by the following claims.

What is claimed is:

1. A valve device comprising a valve body having opposed seat-engaging faces, said valve device also including opposed stems, each stem extending from said valve body, said valve device further including:
    a bifurcated, internally bored, valve seat including opposed valve seat segments, each segment including internally bored, sealing cylinder means, seat means, and depending skirt means with lug means radially extending therefrom;
    said valve body movable within the internal bore of said valve seat from a first position engaging one of said segment's seat means to a second position engaging the other of said segment's seat means;
    said bifurcated valve seat being sealingly and movably positioned within bore means in a housing block;
    actuator means for exerting a force urging said valve body from one of said positions toward the other;
    spring means for exerting a force urging said valve body from said other position toward the first;
    first and second adapter means for releasably linking said housing block to opposite ones of said valve seat segments, each of said adapters including female fastener means for rotatably receiving one of said lugs.

2. Flow control valve member comprising:
housing block means having;
    high pressure fluid inlet means,
    first outlet means for high pressure fluid,
    second outlet means for exhaust fluid,
    passageway means through said housing means and in communication with said inlet and both outlet means,
    segmented valve seat means spacedly positioned in said passageway means,
control means for opening communication between said inlet means and said first outlet means while blocking communication between said inlet means and said second outlet means, and for opening communication between said inlet means and said second outlet means while blocking communication between said inlet means and said first outlet means,
    said control means including valve means shiftably received by said valve seat means and shiftable between a first position opening communication between said inlet means and said first outlet means and a second position opening communication between said inlet means and said second outlet means;
    said valve means including a body portion with opposed valve-seat-engaging faces,
    opposed piston members positioned against opposite ends of said valve means,
    spring means carried by a spring cap biasing said valve means toward said second position,
    actuator controlled means for urging said valve means toward said first position,
    skirts depending from the axial distal end of each segment, and radial lug means depending from each said skirt,
    first adapter means removably securing said actuator controlled means to said housing, said first adapter means being threadedly disengageable from said housing means and having female fastener means for rotatable engagement with one of said valve seat lugs,
    second adapter means removably securing said spring cap to said housing, said second adapter means being threadedly disengageable from said housing and having female fastener means for rotatable engagement with another one of said lugs.

* * * * *